United States Patent
Lewis, Jr. et al.

(10) Patent No.: US 8,065,225 B1
(45) Date of Patent: Nov. 22, 2011

(54) SYSTEM AND METHOD FOR ACQUIRING A MORTGAGE LOAN

(75) Inventors: Harold Lewis, Jr., Duluth, GA (US); Tracey G. Amos, Silver Springs, MD (US); Eric Ronald Anders, Smyrna, GA (US); Nitirwork Armstrong, Silver Springs, MD (US); Sidney Vince Credle, Jr., McKinney, TX (US); Terri Lynn Davis, Greenwood Village, MD (US); Thomas L. King, Gurnee, IL (US); Gregory Joseph Phillips, Landenberg, PA (US); Robert John Sahadi, Clarksburg, MD (US)

(73) Assignee: Fannie Mae, Washington, DC (US)

( * ) Notice: Subject to any disclaimer, the term of this patent is extended or adjusted under 35 U.S.C. 154(b) by 0 days.

(21) Appl. No.: 11/901,720

(22) Filed: Sep. 18, 2007

Related U.S. Application Data

(60) Provisional application No. 60/845,560, filed on Sep. 19, 2006.

(51) Int. Cl.
*G06Q 40/00* (2006.01)
(52) U.S. Cl. ............................................. 705/38; 705/35
(58) Field of Classification Search .................. None
See application file for complete search history.

(56) References Cited

U.S. PATENT DOCUMENTS

| | | | |
|---|---|---|---|
| 5,995,947 A * | 11/1999 | Fraser et al. .................... | 705/38 |
| 6,904,412 B1 | 6/2005 | Broadbent et al. | |
| 6,999,942 B2 | 2/2006 | Kemper et al. | |
| 7,089,503 B1 | 8/2006 | Bloomquist et al. | |
| 7,366,694 B2 * | 4/2008 | Lazerson ........................ | 705/38 |
| 7,620,598 B2 | 11/2009 | McDonald et al. | |
| 7,653,592 B1 | 1/2010 | Flaxman et al. | |
| 2001/0005829 A1 | 6/2001 | Raveis, Jr. | |
| 2001/0029482 A1 * | 10/2001 | Tealdi et al. .................... | 705/38 |
| 2001/0047326 A1 * | 11/2001 | Broadbent et al. .............. | 705/38 |
| 2002/0069159 A1 | 6/2002 | Talbot et al. | |
| 2002/0103669 A1 * | 8/2002 | Sullivan et al. .................. | 705/1 |
| 2003/0036994 A1 | 2/2003 | Witzig et al. | |

(Continued)

FOREIGN PATENT DOCUMENTS

WO      WO 99/13425 A1      3/1999

(Continued)

OTHER PUBLICATIONS

Guide to Underwriting with Desktop Underwriter, Sep. 2002, pp. 3, 4, 60, 61.*

(Continued)

*Primary Examiner* — Rajesh Khatter
*Assistant Examiner* — Carol See
(74) *Attorney, Agent, or Firm* — Foley & Lardner LLP

(57) ABSTRACT

A computer-implemented method for processing an application for a mortgage loan, such that the mortgage loan is configured to include a set of financial lending requirements and further include certain financial lending risks associated with financing the mortgage loan. The steps of the method include receiving the mortgage loan application, processing the mortgage loan application through an electronic database, applying the set of financial lending requirements to the mortgage loan application, generating a listing of at least one eligible lender or loan product based on the application of the financial lending requirements to the mortgage loan application, and submitting the mortgage loan application to the eligible lender, the mortgage loan being configured such that the financial lending risks are configured to be absorbed by a secondary mortgage market investor.

10 Claims, 13 Drawing Sheets

U.S. PATENT DOCUMENTS

| | | | |
|---|---|---|---|
| 2003/0050884 A1 | 3/2003 | Barnett | |
| 2003/0135447 A1 | 7/2003 | Blanz et al. | |
| 2003/0135448 A1 | 7/2003 | Aguias et al. | |
| 2003/0144949 A1 | 7/2003 | Blanch | |
| 2003/0229592 A1 | 12/2003 | Florance et al. | |
| 2004/0030616 A1 | 2/2004 | Florance et al. | |
| 2004/0049445 A1 | 3/2004 | Kishore | |
| 2004/0083164 A1 | 4/2004 | Schwartz et al. | |
| 2004/0111619 A1 | 6/2004 | Laurie et al. | |
| 2004/0128149 A1 | 7/2004 | Kemper et al. | |
| 2004/0138912 A1 | 7/2004 | Campbell | |
| 2004/0138996 A1 | 7/2004 | Bettenburg et al. | |
| 2004/0148211 A1 | 7/2004 | Honarvar et al. | |
| 2004/0230512 A1 | 11/2004 | Gulati | |
| 2005/0203839 A1 | 9/2005 | Dowell et al. | |
| 2006/0004651 A1 | 1/2006 | Corr et al. | |
| 2006/0059073 A1* | 3/2006 | Walzak | 705/35 |
| 2006/0100944 A1 | 5/2006 | Reddin et al. | |
| 2006/0136330 A1 | 6/2006 | DeRoy et al. | |
| 2006/0161448 A1 | 7/2006 | Weild, IV | |
| 2007/0050285 A1* | 3/2007 | Freeman | 705/38 |
| 2007/0106523 A1 | 5/2007 | Eaton et al. | |

FOREIGN PATENT DOCUMENTS

| | | |
|---|---|---|
| WO | WO 99/59084 A1 | 11/1999 |
| WO | WO 01/41019 A2 | 7/2001 |
| WO | WO 2006/020988 A2 | 2/2006 |

OTHER PUBLICATIONS

LoanPerformance Iintroduces Pretell™, Mortgage Industry's First Naitonal Loan-Level Prepayment Scoring System, PR Newswire, Oct. 25, 2004, 3 pgs.*

Abraham, Jesse, A life preserver for loans, Mortgage Banking, Jun. 1999, vol. 59, iss. 9, 6 pgs.*

Fannie Mae, "Guide to Underwriting with Desktop Underwriter®", Sep. 2002; 63 pgs.

Edocs, "edocs Teams with Fannie Mae to Offer Lenders Online Account Management Solution," Press Release, Mar. 12, 2001, 2 pgs., edocs, Inc., USA.

Fannie Mae, "Fannie Mae Unveils MORNETPlus on the Web; Lenders Can Now Access Automated Underwriting and Other Mortgage Transaction Services on Fanniemae.com," Press Release, Mar. 23, 2000, 2 pgs., Fannie Mae, USA.

Fannie Mae, "Fannie Mae Announces MORNETPlus Connections; Now Provides Lenders with Access to the Largest Network of Service Providers on the Web for Appraisals, Flood Certificates, Title Insurance and Closing, and Escrow Services," Press Release, Apr. 18, 2001, 3 pgs., Fannie Mae, USA.

Fannie Mae, "Fannie Mae and First American Financial to Provide Lenders with Electronic Access to More Products on MORNETPlus Network; Appraisals, Flood Certificates, and Title Insurance in Offering," Press Release, Dec. 21, 1999, 2 pgs, Fannie Mae, USA.

Raines Franklin D., "Statement by Franklin D. Raines Chairman and CEO of Fannie Mae, Speech at 2003 Fannie Mae eBusiness Forum," Sep. 17, 2003, 6 pgs, Fannie Mae, USA.

Object Management Group, "Fannie Mae", CORBA Banking/Finance, Sep. 17, 2001, 2 pgs, Object Management Group, Needham, MA, USA.

Smith Tom, "E-Commerce Holds Keys to Home Ownership: Fannie Mae drives hug volumes of mortgage business to its e-marketplace," Internetweek.com, Undated, 5 pgs., Internetweek.com, USA.

Smith Tom, "Fannie Mae Ramps up Web Apps: Q&A with Julie St. John, Executive Vice President and Chief Technology Office and Michael Williams President of Fannie Mae e-Business," Internetweek.com, Undated, 11 pgs., Internetweek.com, USA.

Sun, "Success on Sun: Software Development Case Study Federal National Mortgage Association (Fannie Mae)," Mar. 1995, 10 pgs, Sun, USA.

Raines Franklin D., "Speech by Franklin D. Raines Chairman and CEO of Fannie Mae, Fannie Mae and the Mortgage Industry in the E-Commerce Age," May 8, 2000, 20 pgs., Fannie Mae, USA.

Williams Michael, "Technology and Other Keys to the Boom in Refinancing," American Banker, Apr. 20, 2003, 3 pgs, vol. 168, Issue 63, p. 8., American Banker USA.

Breakthroughs in Mortgage Banking: Looking Toward the Future, Real Estate Finance Press, Mortgage Bankers Association of America, 1996, pp. 5-1-5-8, ISBN 1-57599-016-4, Jess Lderman, Editor.

Fannie Mae, "Delivering Loans for MBS", 1996, 138 pages, Fannie Mae, Washington, DC, USA.

Fannie Mae, "Guide to Underwriting with Desktop Underwriter", Oct. 1997, 152 pages, Verison 4.0, Fannie Mae, Washington, DC, USA.

Fannie Mae, "MORNET MBS Pool Submission System User's Guide", Sep. 1998, 259 pages, Version 5.3, Fannie Mae, Washington, DC, USA.

Fannie Mae, "Making Good Delivery A Guide to Delivering Loans for Cash and MBS", 1994, 121 pages, Fannie Mae, Washington, DC, USA.

Fannie Mae, "MORNET Cash Delivery System User's Guide", Nov. 1997, 177 pages, Version 2.6, Fannie Mae, Washington, DC, USA.

Fannie Mae, "Delivering Loans for Cash", 1997, 96 pages, Fannie Mae, Washington, DC, USA.

Fannie Mae, "MORNET Manager User's Guide", Nov. 1998, 187 pages, Version 3.0, Fannie Mae, Washington, DC, USA.

Fannie Mae, "MORNET Servicing Support System User's Guide", Dec. 1998, 370 pages, Fannie Mae, Washington, DC, USA.

Fannie Mae, "Selling", 1995-2002 et al, 1119 pgs, Fannie Mae, USA.

Fannie Mae, "Investor Accounting: Cash", 1996, 132 pages, Fannie Mae, Washington, DC, USA.

Fannie Mae, "Secondary Marketing: Cash", 1997, 81 pages, Fannie Mae, USA.

Fannie Mae, "General Servicing Fundamentals", 1996, 174 pages, Fannie Mae, USA.

Laser Overview, May 1993, chapters 1-18.

Fannie Mae, "Servicing Guide", 1995-2002 et al, 318 pages, Forward, Table of Contents, Sections III, IX, X, and XI, Fannie Mae, USA.

Office Action for U.S. Appl. No. 11/857,304, mail date Feb. 5, 2009, 32 pages.

Office Action for U.S. Appl. No. 11/857,304, mail date Jul. 22, 2009, 30 pages.

Office Action for U.S. Appl. No. 11/901,965, mail date Mar. 17, 2009, 15 pages.

Office Action for U.S. Appl. No. 11/901,965, mail date Sep. 11, 2009, 10 pages.

Gonzalez, Building Sustainable Housing Finance Markets: Proceedings of the Housing Finance Roundtable in the Andean Region, Housing Finance International, Mar. 2005, 12 pages, vol. 19, Iss. 3, London.

Harvey et al., Low- and Moderate-Income Home Financing: What are the Trends in Kansas City?, Federal Reserve Bank of Kansas City, Financial Industry Perspectives, Oct. 2003, pp. 1-14.

Office Action for U.S. Appl. No. 11/857,926, mail date Feb. 23, 2010, 34 pages.

Office Action for U.S. Appl. No. 11/857,926, mail date Jul. 7, 2010, 36 pages.

* cited by examiner

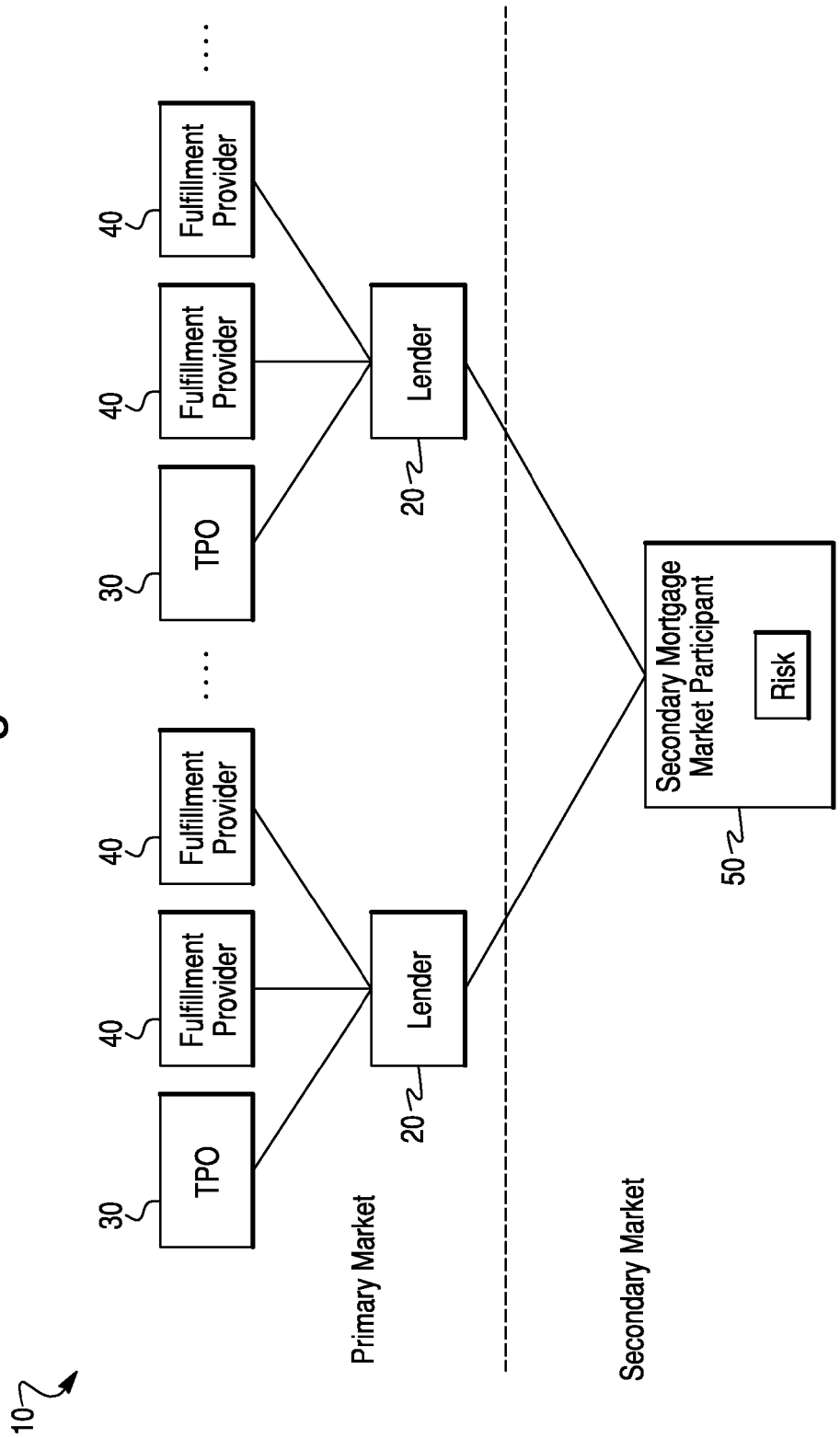

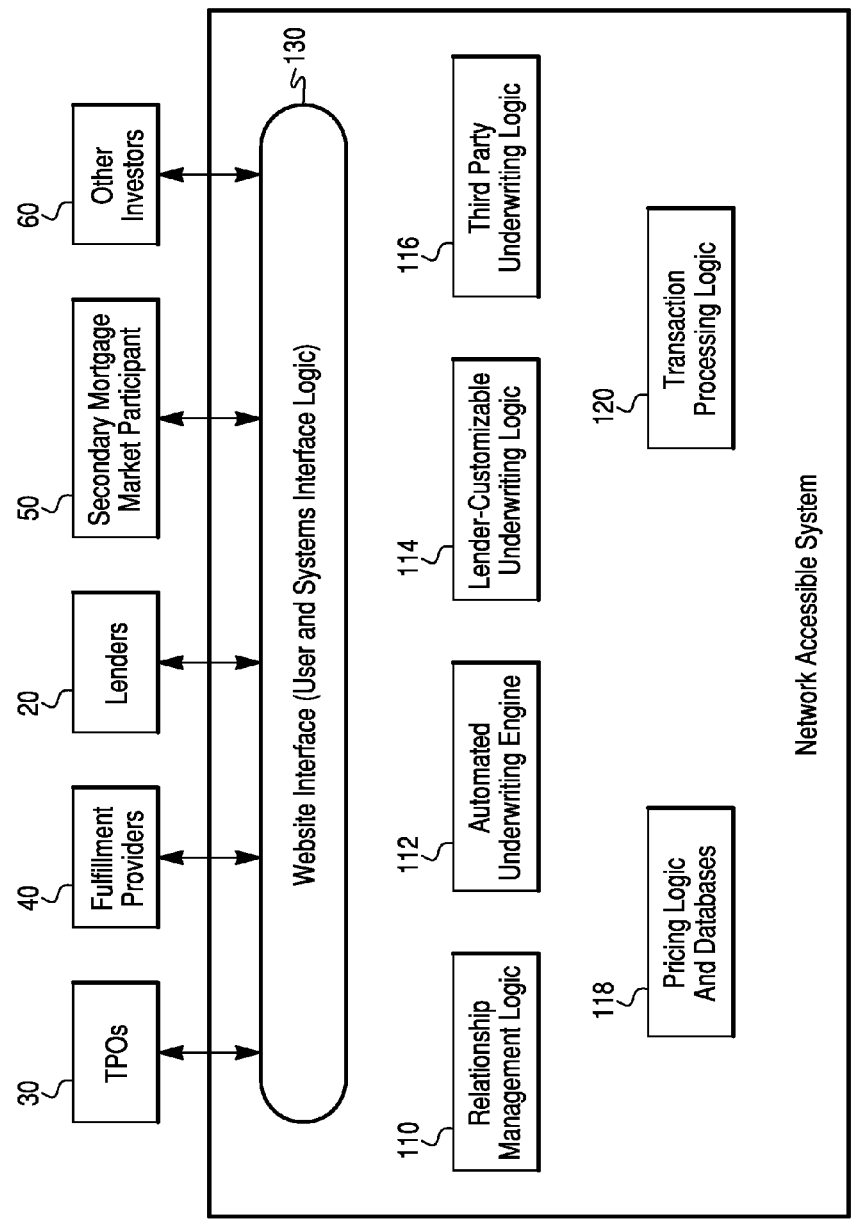

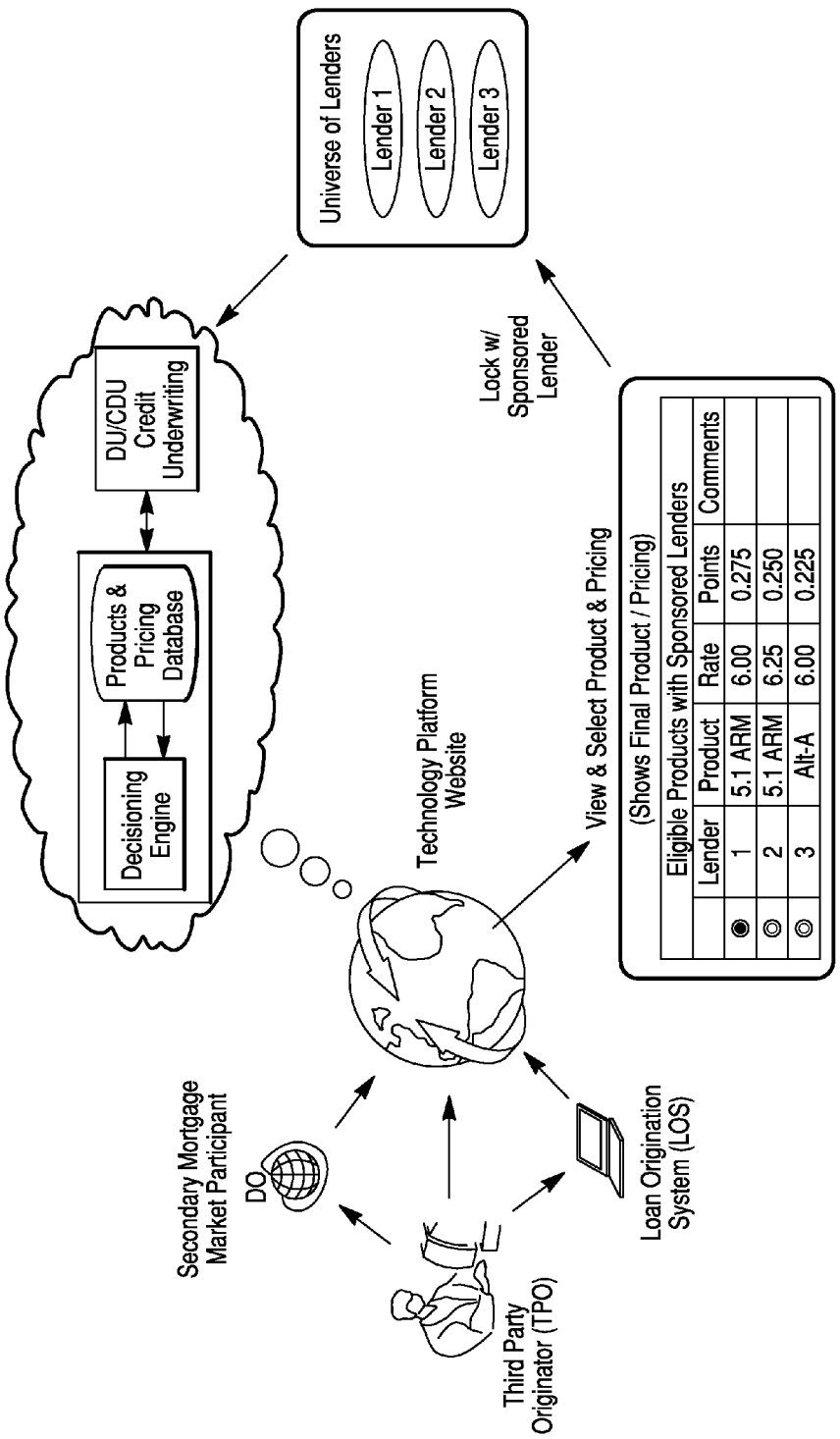

SYSTEM AND METHOD FOR ACQUIRING A MORTGAGE LOAN

CROSS REFERENCE

The present application claims the benefit of priority to U.S. Provisional Patent Application No. 60/845,560, entitled "Mortgage Delivery System and Method" filed on Sep. 19, 2006, which is incorporated by reference in its entirety.

The present application also expressly incorporates by reference U.S. patent application Ser. No. 10/324,090, entitled "Method and Apparatus for the Customization of an Automated Loan Underwriting System," filed Dec. 20, 2002 ("the '090 application"), U.S. patent application Ser. No. 10/733,703, entitled "System and Method for Facilitating Home Ownership," filed Dec. 11, 2003 ("the '703 application"), U.S. patent application Ser. No. 10/736,291, entitled "Systems and Methods for Facilitating the Flow of Capital Through the Housing Finance Industry," filed Dec. 15, 2003 ("the '291 application"), U.S. patent application Ser. No. 11/002,010, entitled "System and Method for Processing a Loan," filed Nov. 30, 2004 ("the '010 application"), and U.S. patent application Ser. No. 11/508,470, entitled, "System and Method for Transferring Mortgage Loan Servicing Rights," filed Aug. 23, 2006 ("the '470 application"), all of which are incorporated by reference in their entirety.

RELATED ART

Typically, when a potential borrower seeks a mortgage loan, for example, in purchasing real property, the borrower may opt to consult a number of financial institutions. Such financial institutions may include a primary mortgage lender, such as a bank. In many other cases, borrowers may consult with a third-party originator ("TPO") or a fulfillment provider, in order to obtain the funds necessary to purchase the property. The TPOs may include brokers, correspondents, non-profit organizations, realtors, faith-based organizations, affinity groups, credit unions, housing finance agencies, builders, and other trusted advisors. The fulfillment providers may include title search services, flood certification services, credit bureaus, property tax services, payment services, fraud protection services, real estate services, and so on. The lenders, TPOs, and fulfillment providers make loans to borrowers in the "primary mortgage market." Typically, after a loan is made in the primary mortgage market, the loans may be sold to investors in the "secondary mortgage market."

Participants (e.g., investors) in the secondary mortgage market may typically establish underwriting guidelines for the purchase or guarantee of a mortgage loan. Such guidelines permit the secondary mortgage market participant to manage the risk of loss from a borrower's default. For example, the guidelines may be designed to assess the creditworthiness of the borrower, as well as the value of the mortgaged property relative to the amount of the mortgage loan. Lenders determine whether to make mortgage loans and frequently have several secondary mortgage market participants to whom they sell loans. When originating loans to be purchased or guaranteed by a secondary mortgage market participant, the lenders may use underwriting guidelines acceptable to the secondary mortgage market participant to whom the loan will be sold. Typically, the secondary mortgage market participant may rely on the selling lender's representations and warranties that the mortgage loans being purchased (or guaranteed) meet specified criteria, including that the mortgage loans conform to the underwriting guidelines of the secondary mortgage market participant. Sometimes, when a loan goes into default, or when a borrower is behind in its payments and the loan is at risk of going into default, an audit is performed to assess compliance with the underwriting guidelines and/or other criteria. In the event that a lender is found to have breached its representations and/or warranties, the secondary mortgage market participant may seek remediation by the lender, for example, by requiring that the lender repurchase the loan from the secondary mortgage market participant.

In such cases, where the borrower opts to consult a TPO or a fulfillment provider, certain operations that may be performed in connection with originating a mortgage loan are performed by the TPO or fulfillment provider, and not by the lender. Thus, some of the representations and warranties made by the lender may relate to aspects of the loan origination process not handled by the lender. Therefore, because the lender makes such representations and warranties, the lender takes on risk associated with aspects of the loan origination process that may have been performed by such other entities.

Some borrowers present higher default risks, for example, due to lower incomes, incomplete credit histories, and so on. Some lenders may be more reluctant to work with TPOs and fulfillment providers in providing loans to such borrowers because such borrowers are seen as being higher risk and, further, because the lender takes on risk associated with aspects of the loan origination process that may have been performed by TPOs and fulfillment providers, as described above. As a result, fewer lenders may be willing to work with such borrowers, and such borrowers may potentially end up being underserved. It would be advantageous to provide an improved mortgage loan system, in order to facilitate providing better access to mortgage loans for such underserved borrowers.

SUMMARY

An embodiment relates to a computer-implemented system for processing a loan application. The system comprises a database configured to include a plurality of pending loan applications and a server configured to receive and transmit data relating to the loan application, such that the system is configured to minimize a lender's exposure to financial risks associated with financing a loan. The system is further configured such that a secondary mortgage market investor absorbs the risks associated with financing the loan.

Another embodiment relates to a computer-implemented method for processing an application for a mortgage loan, such that the mortgage loan is configured to include a set of financial lending requirements and further include certain financial lending risks associated with financing the mortgage loan. The steps of the method include receiving the mortgage loan application, processing the mortgage loan application through an electronic database, applying the set of financial lending requirements to the mortgage loan application, generating a listing of at least one eligible lender or loan product based on the application of the financial lending requirements to the mortgage loan application, and submitting the mortgage loan application to the eligible lender, the mortgage loan being configured such that the financial lending risks are configured to be absorbed by a secondary mortgage market investor.

Another embodiment relates to a computer-implemented method for managing a mortgage loan transaction, the mortgage loan transaction including a plurality of parties, wherein the plurality of parties includes primary and secondary mortgage market participants. The steps of the method comprise soliciting criteria from a first party via an electronic questionnaire, querying a database for a listing of eligible mortgage market participants that adhere to the criteria of the first party, and applying the set of requirements to the database of eligible mortgage market participants, wherein the electronic questionnaire is configured to enable the party to rank the importance of the requirements that a mortgage market participant must adhere.

Another embodiment relates to a mortgage loan delivery system that provides a compelling utility for brokers and other trusted advisors, in order to more effectively service underserved communities. Such a mortgage loan delivery system may facilitate closing the homeownership gap between underserved borrowers of varying income brackets, credit profiles and/or geographic regions (i.e., underserved regions) and other borrowers.

Another embodiment relates to a mortgage loan delivery system with tools provided by the overall technology platform for TPOs, fulfillment providers, and lenders (including relationship management tools, pricing tools, and transaction processing tools). Such a mortgage loan delivery system may include a dashboard that is provided to primary mortgage market participants to manage their mortgage pipeline.

Another embodiment relates to a mortgage loan delivery system for the underwriting process by which a "near certainty of yes" is provided to the TPO. The platform of the mortgage loan delivery system may be configured to work with an electronic loan underwriting engine and alternative automated underwriting engines from sponsoring lenders. The platform may provide participating lenders with the ability to build/maintain product underwriting and pricing rules for the electronic loan underwriting module and alternative automated underwriting engines directly on the platform.

An embodiment relates to a mortgage loan delivery system for the integration of the servicing execution tool and the risk transformation facility with the mortgage loan delivery system platform, both of which add to the capability of the mortgage loan delivery system to produce a highly fungible mortgage asset which can be easily sold into the secondary mortgage market.

Another embodiment relates to a mortgage loan delivery system having new risk mitigation techniques that are developed to mitigate risk created by TPOs and fulfillment providers.

While certain features and advantages are described, it will be appreciated that the teachings herein may be used to implement embodiments of the invention which do not have any of these features and advantages, but which have other features and advantages.

BRIEF DESCRIPTION OF THE DRAWINGS

The application will be more readily understood by reference to the following description taken with the accompanying drawings, in which:

FIG. 1 is a chart of a lending model including primary and secondary mortgage market participants.

FIG. 2B is a diagram of the technology platform of FIG. 2A shown in greater detail.

FIG. 3 is a general overview of a mortgage loan delivery system.

DETAILED DESCRIPTION

Figure 2A:
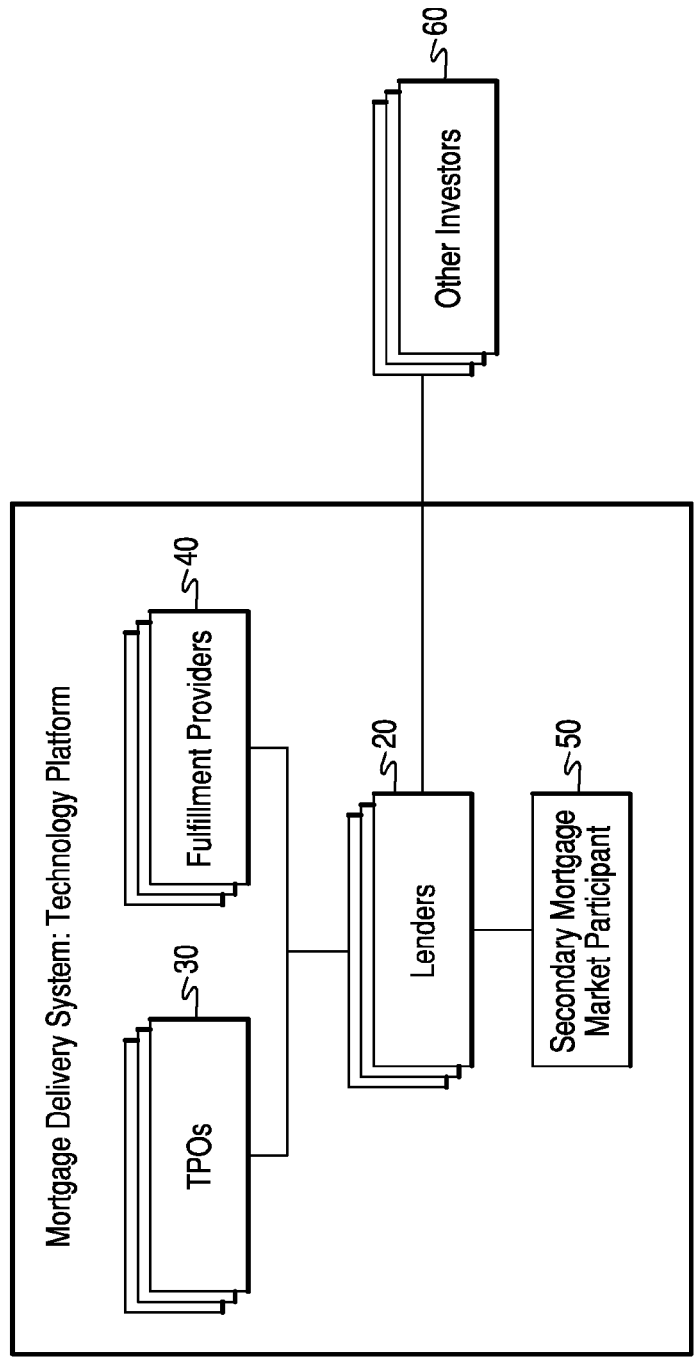
FIG. 2A is a diagram of a technology platform that connects TPOs, fulfillment providers, lenders, and secondary mortgage market participants.

Referring now to FIG. 1, a mortgage loan delivery system 10 is shown, wherein the lender 20 avoids taking on risk from TPOs 30 and fulfillment providers 40. In FIG. 1, the risk is taken on by the secondary mortgage market participant 50. As a practical matter, this arrangement may, for example, be implemented by not including the typical representations and warranties (discussed above) in the agreement governing the sale of the mortgage loan from the lender to the secondary mortgage market purchaser. In order to mitigate this risk, the secondary mortgage market participant 50 may perform quality control audits of the TPOs 30 and fulfillment providers 40. As another example, in order to mitigate this risk, the secondary mortgage market participant 50 may enter into contracts pursuant to which, for example, the fulfillment providers 40 are certified for participation in the system, agree to indemnify the secondary mortgage market purchaser 50 for non-compliance with underwriting guidelines (e.g., in the case of fraud), or otherwise agree to abide by quality control standards and ensure compliance with underwriting guidelines. The lender 20 is not responsible for the risk associated with other aspects of the loan origination process. Such a system provides an alternative way for lenders to provide financing for loans originated by smaller TPOs that may typically work with underserved borrowers, while permitting the lenders to avoid taking on risk that may be presented by such borrowers. The system thereby facilitates providing better service and access to mortgage loans for such underserved borrowers.

Referring now to FIG. 2A, a technology platform 100 that connects lenders 20, TPOs 30, fulfillment providers 40, and a secondary mortgage market participant 50 is shown. As will be appreciated, each of these parties may have its own internal computer systems, which it may use to manage its business processes (e.g., loan origination systems, customer relationship management systems, accounting systems, and so on). The computer systems of each respective entity may be connected to the technology platform 100 through a communication network, such as the Internet. The mortgage technology platform 100 may, for example, be implemented by one or more servers which execute program logic to implement the features described herein.

As described in greater detail below, the mortgage delivery system 10 may enable TPOs 30 to originate mortgages that may be purchased by multiple different investors 50, 60. For example, some investors 50, 60 may only purchase certain types of loans and not other types of loans (e.g., based on loan value, based on perceived riskiness of the loan, or based on other characteristics). The technology platform 100 may provide "one stop shopping," such that TPOs 30 may be confident that the technology platform 100 may be used regardless of the loan value, risk characteristics, and other characteristics of the loan that is ultimately originated. Thus, if a certain type of mortgage product ultimately turns out to be a better fit for a particular borrower, but the secondary mortgage market participant 50 is not able to purchase that type of mortgage product, the technology platform 100 may still be used. The TPO 30 may be confident that it will not need to use another platform 100 to originate the mortgage if the secondary mortgage market participant 50 is not able to purchase the mortgage. Other investors 60 may be directly connected to the technology platform 100 (e.g., by having access to the website) or may be indirectly connected to the technology platform 100 (e.g., by being connected to lenders 20 which have access to the website).

FIG. 2B shows the technology platform of FIG. 2A is shown in greater detail. The technology platform may include relationship management logic 110, an automated underwriting engine 112, lender customizable underwriting logic 114, third party underwriting logic 116, pricing logic and databases 118, transaction processing logic 120, and/or other components. Lenders 20, TPOs 30, fulfillment providers 40, secondary mortgage market participant 50, and/or other investors may access the technology platform 100 through a network connection (e.g., the Internet) using a website interface provided by user and systems interface logic 130.

Referring now to FIG. 3, a general overview of an embodiment of the mortgage loan delivery system 10 as described herein is shown. The mortgage loan delivery system may be hosted on the technology platform 100, e.g., externally on an Internet server or internally by a secondary mortgage market participant 50. In one embodiment, the mortgage loan delivery system 50 includes a set of tools implemented on the technology platform 100. For example, the technology platform 100 may include relationship management logic 110 (e.g., rules engines, user interfaces, and so on) that may enable the management of relationships between primary mortgage market participants (e.g., lenders 20, TPOs 30, fulfillment providers 40). For example, relationship management logic may be provided that enables TPOs 30 to select fulfillment providers 40 for loan processing and to select lenders 20 for loan financing. The selections by the TPOs 30 may be made in real-time (through a graphical user interface, as loans are originated) or in advance (through a rules engine, allowing automatic routing of service requests and loan sales). Likewise, the various different lenders 20 and fulfillment providers 40 using the platform 100 may also be provided with similar tools.

Figure 4:
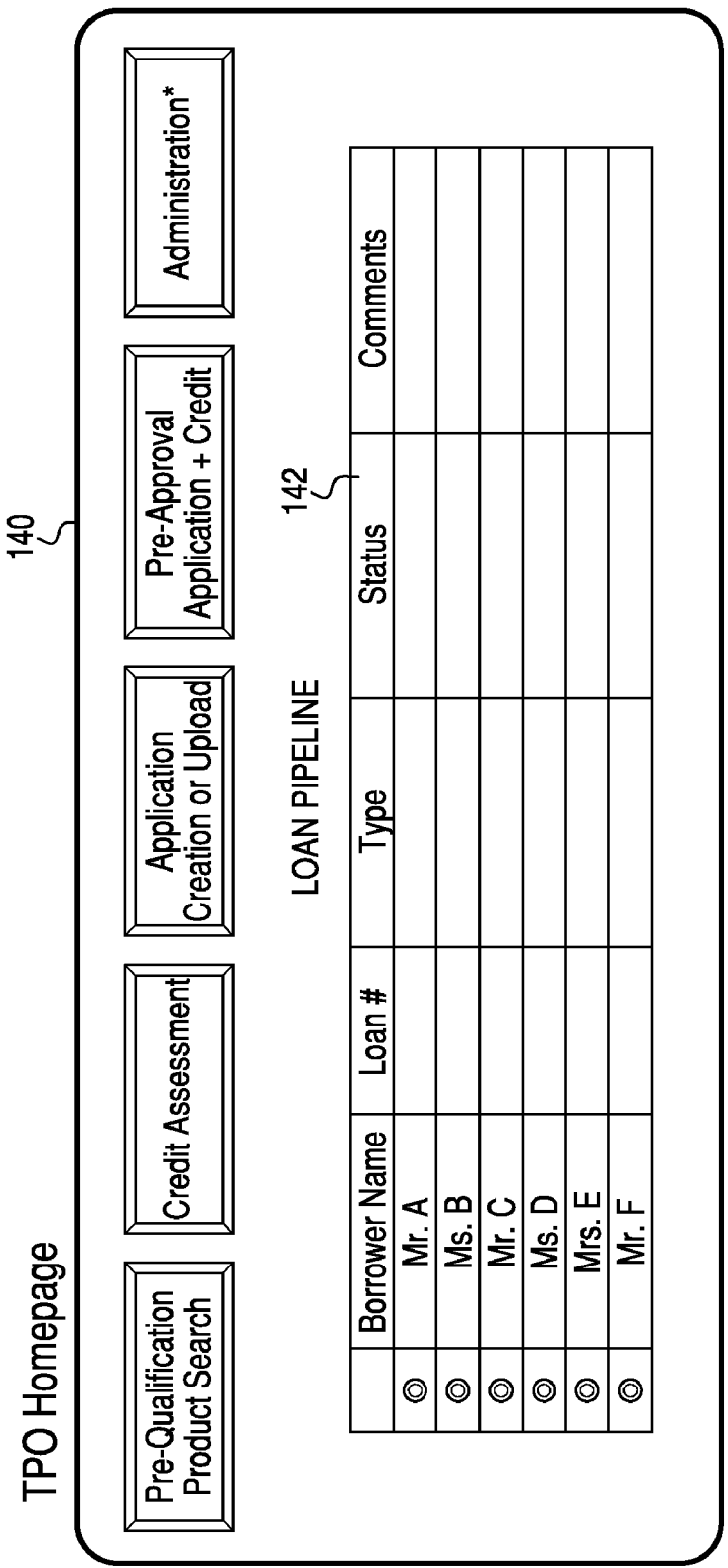
FIG. 4 is a user interface of the mortgage loan delivery system.

Referring now to FIG. 4, a user interface 120 provided by user interface logic 130 of the technology platform 100 is shown. The user interface may be in the form of a dashboard that is provided to TPOs to manage their mortgage pipeline, e.g., in the manner that a pipeline manager dashboard is provided to lenders 20 in the above-mentioned '291 application. The dashboard 140 displays the TPO's pipeline of loans, including loans being funded through multiple lenders. The dashboard may provide the TPO with the ability to view current loan transaction status in field 142 based on updated information collected by the platform 100. For example, when a fulfillment provider 40 finishes completing a task, this may be reflected on the TPO dashboard 140. The dashboard 140 may be updated based on information collected from multiple lenders 20 and multiple fulfillment providers 40. Thus, the TPO dashboard 140 may reflect the real-time status of the loans in the TPO pipeline as the loans are processed by multiple different fulfillment providers 40 and as they are routed to different lenders 20 for financing. The dynamic updating of loan processing status is also described in greater detail in the above mentioned '010 application.

The platform 150 may also include pricing logic and databases 118 to provide lenders 20 and fulfillment providers 40 with the ability to apply pricing and eligibility adjustments as necessary according to their business needs. The information may be dynamically updated in the platform 100 and reflected in the information that is provided to TPOs 30 for each of the lenders 20 and fulfillment providers 40. The system allows TPOs 30 to provide borrowers with more complete and accurate pricing information earlier in the loan origination process.

The platform 100 may also include transaction processing logic to support transaction processing for transactions associated with service requests and loan financing routed using the platform 100. The platform 100 assists TPOs 30 with the selection of fulfillment providers 20 for loan processing and the selection of lenders 40 for loan financing and, further, maintains pricing information for each of the parties. The platform 100 may therefore have complete information concerning who has performed what services and at what price. Thus, the platform 100 may have all the information needed to process all transactions between the lenders 20, TPOs 30, fulfillment providers 40, and a secondary mortgage market participant 50. As a result, funds may flow easily and accurately between the parties involved in the loan origination process.

The technology platform 100 may be configured to include an underwriting logic including automated underwriting engine 112, lender-customizable underwriting logic 114, and third-party underwriting logic 116 by which a "near certainty of yes" is provided to the TPO 30, regardless of the lender 20 that ultimately funds the loan and regardless of the secondary mortgage market participant 50 or other investor 60 that ultimately purchases the loan. The automated underwriting engine 112 is configured to make underwriting recommendations for mortgage loans to be purchased by the secondary mortgage market participant. The lender-customizable underwriting logic 114 is configured to permit lender-specific underwriting guidelines to be taken into account. The platform 100 may provide participating lenders 20 with the ability to build/maintain product underwriting and pricing rules, as described for example in the '090 application, the entirety of which is incorporated by reference. Further, the third party underwriting logic 116 may be simulation logic with rules logic configured to simulate known underwriting guidelines of the other investors 60. In another embodiment, the platform 100 may be configured to integrate with automated underwriting engines made available by such investors 60. The processing performed based on these rules may be reflected in the approval information provided to TPOs 30. As a result, the approval may be as close to final as the borrower can obtain at the initial stage.

To implement the features described above, other features described below, and other features described in the following patent applications, the technology platform may be provided in accordance with the teachings of U.S. patent application Ser. No. 10/733,703, entitled "System and Method for Facilitating Home Ownership," filed Dec. 11, 2003 ("the '703 application"), U.S. patent application Ser. No. 10/736,291, entitled "Systems and Methods for Facilitating the Flow of Capital Through the Housing Finance Industry," filed Dec. 15, 2003 ("the '291 application"), U.S. patent application Ser. No. 11/002,010, entitled "System and Method for Processing a Loan," filed Nov. 30, 2004 ("the '010 application"), all of which are hereby expressly incorporated by reference.

Other features may also be utilized to facilitate underwriting and pricing the full breadth of mortgage products acquired through the technology platform 100. For example, the eligibility and underwriting may be automated for certain mortgage products that are made available in conjunction with lender partners of the secondary mortgage market participant 50 through the technology platform 100. Additionally, loan level pricing may be dynamically and fully adjusted based on information provided by lenders 20 and fulfillment providers 40 to display back to the TPOs 30 in the product selection including payment and discounted/premium pricing. As will be appreciated, the website interface provided by user and systems interface logic 130 may provide for basic data capture and browser features to capture data and to present back the results from the technology platform 100.

The technology platform 100 may be integrated with the servicing execution tool described in the '470 application, which is expressly incorporated by reference, and the risk transformation facility described below with the mortgage loan delivery system platform, both of which add to the capability of the mortgage loan delivery system to produce a mortgage loan which can be easily sold into the secondary mortgage market. Integration with the servicing execution tool may allow loan asset produced by the technology platform 100 to be quickly sold into the secondary market on a flow basis. The servicing execution tool may completely avoid the need for the lender 20 to perform any loan servicing or to otherwise manage the servicing asset. If the borrower goes into default, the entity that has purchased servicing rights will be responsible for following up with the borrower, as opposed to the lender 20. Thus, by using the servicing execution tool to dispose of servicing assets on a flow basis, the lender 20 may be subjected to less risk in connection loans originated using the TPOs 30 and fulfillment providers 40 that may work with underserved borrowers, as described above, thereby facilitating providing better access to mortgage loans for such underserved borrowers. Integration with a risk transformation system and method may allow the mortgage loan delivery system platform to provide one-stop shopping for selling mortgages into the secondary mortgage market. TPOs 30 working with underserved borrowers may not need to worry about whether the loan may be too risky for purchase by a secondary mortgage market participant. The integration of a risk transformation system in the mortgage loan delivery system platform provides a pass-through channel for more risky loans to be purchased by the secondary mortgage market participant 50 and then immediately resold in the secondary mortgage market to other investors willing to accept the heightened risk associated with such loans.

The mortgage loan delivery system 10 may include risk mitigation tools and processes that mitigate risk created by TPOs 30 and fulfillment providers 40. Such risk mitigation tools and processes may be used by the secondary mortgage market participant 50 to mitigate risks created by TPOs 30 and fulfillment providers 40 during the origination process (counterparty risk, fraud risk, and so on). Such risk mitigation tools and processes may be based on data generated by the technology platform 100 concerning the performance of individual TPOs 30 and fulfillment providers 40. Such evaluations may occur across loans originated through multiple lenders 20. For example, data collected using the technology platform 100 may be used to evaluate the performance of TPOs 30 and fulfillment providers 40 in terms of originating loans that are free of defects in underwriting. Additionally, the data collected using the technology platform 100 may be used to evaluate the performance of TPOs 30 and fulfillment providers 40 in terms of their ability to pull borrowers through the mortgage pipeline, and to assess which TPOs 30 and fulfillment providers 40 may perform better in terms of helping underserved borrowers navigate the process of obtaining a mortgage and buying a home. Additionally, the data collected using the technology platform 100 may be used to evaluate the performance of TPOs 30 and fulfillment providers 40, e.g., in order to provide overall quality scores for respective individual TPOs 30 and fulfillment providers 40, in order to provide a "seal of approval" for individual TPOs 30 and fulfillment providers 40, and so on. Additionally, the data collected using the technology platform 100 may be used to ascertain the number of loans to one or more different types of underserved are originated by TPOs 30 and fulfillment providers 40, e.g., to ascertain the level of penetration of different TPOs 30 and fulfillment providers 40 in different types of underserved markets. Additionally, the data collected using the technology platform 100 may be used to implement pricing incentives. For example, TPOs 30 and fulfillment providers 40 that originate a predetermined number of loans or a predetermined dollar value of loans in underserved markets may receive financial bonuses or other rewards.

Figure 5:
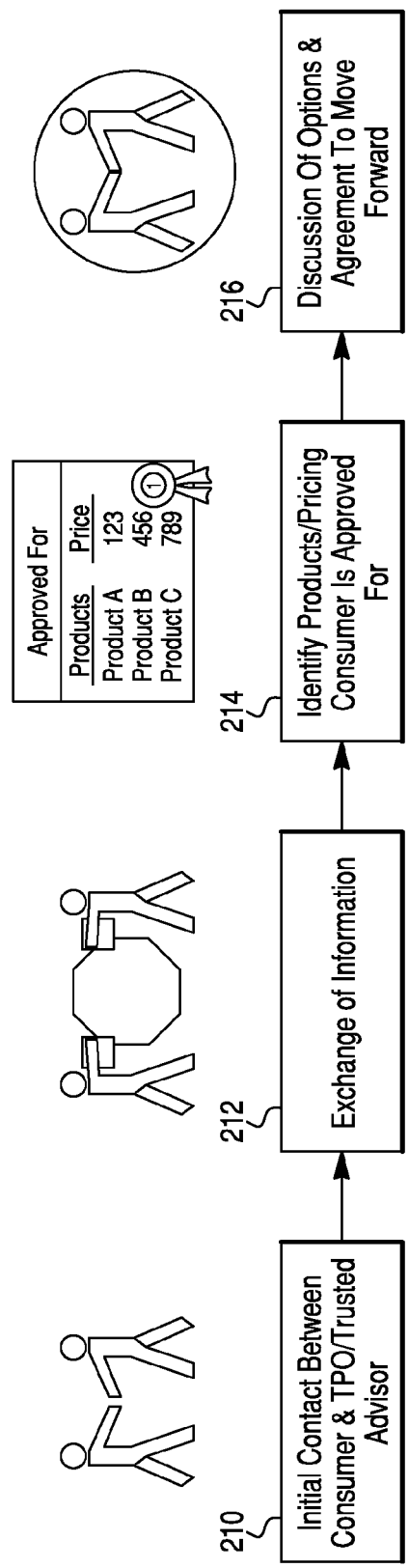
FIGS. 5 and 6 are diagrams of the loan origination process starting with the a trusted advisor and/or a TPO making contact with a borrower.
Figure 6:
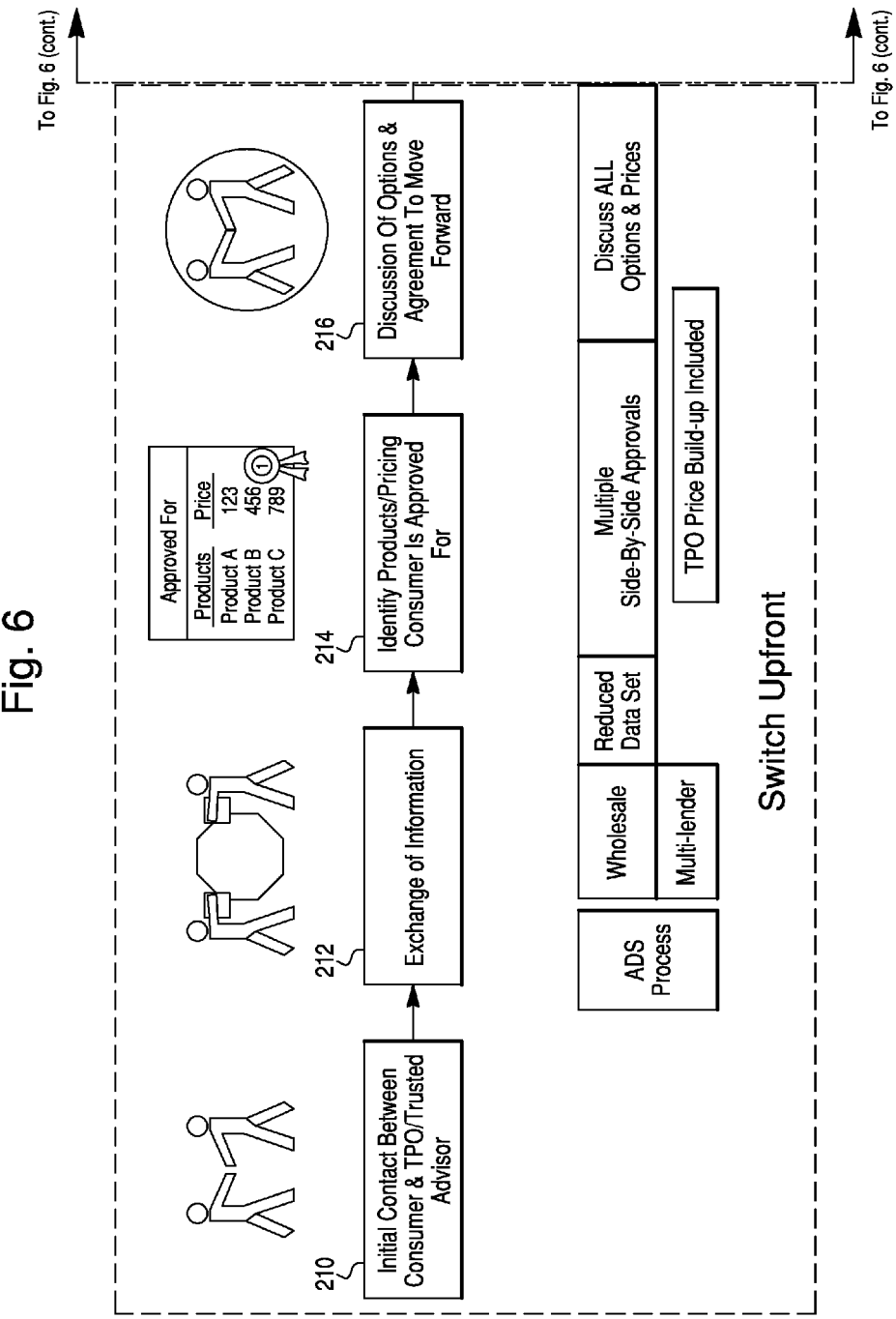
Figure 6:
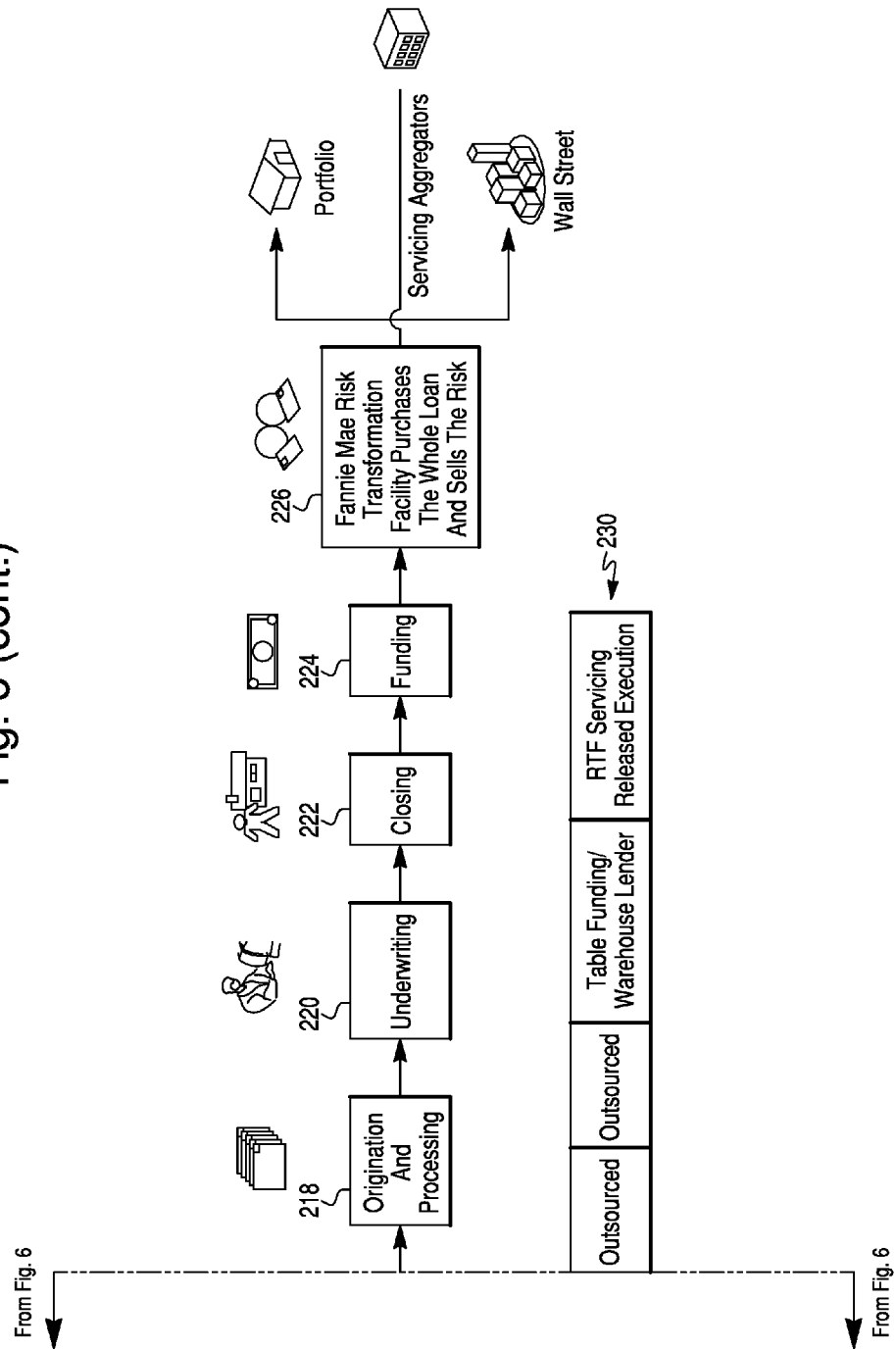

Referring to FIGS. 5 and 6, a loan origination process 200 is shown. The process starts with a TPO making contact with the borrower at step 210. Examples of TPOs include brokers, correspondents, non-profits, realtors, faith-based organizations, affinity groups, credit unions, housing finance agencies, builders, and other trusted advisors. In the "Exchange of Information" step 212, shown in FIG. 5, the pre-qualification may be dynamic and simultaneous at the point of sale. Also, 1003 form data is captured, in order to support a preliminary credit assessment. Further, the loan origination process may be configured to be able to accommodate nontraditional credit information. In the "Identify Products/Pricing" step 214, the preliminary credit assessment may occur. Further, information may be provided on the products and associated prices for which the consumer may qualify. In the "Discussion of Options and Agreements" step 216, the TPO 30 and consumer may discuss the menu of approved products and prices shown at 215. The TPO 20 and consumer may further agree or select a loan product. The system may provide a near certainty of "yes" in final approval for a selected loan product, as described above, by facilitating the submission of the loan application to underwriting logic of different lenders (real or simulated), as described above. There may then be an agreement to move forward with the creation of a mortgage asset for a selected product with a locked price rate. FIG. 6 is similar to FIG. 5 but shows additional information associated with steps 210-224.

As part of providing suggested loan products and pricing, the technology platform 100 permits the TPOs 30 to adjust the included results. The product search compares application and credit data and TPO 30 and borrower preferences against available lender products and pricing. Various product types may be shown, including conventional, sub prime, jumbo and FHA and VA. Filters may be used to prevent products outside of a regional coverage of a TPO 30 or ones not relevant to a particular transaction from displaying in results. Displayed results may include multiple products from the multiple lenders 20, as shown. Side-by-side product comparisons may be provided for best fit, eligible, and ineligible product recommendations. The technology platform 100 may also be configured to provide reasons for ineligibility and guidance on "near miss" products.

Product pricing may reflect all-in prices stipulating conditions for all possible price adjustments of lenders 20 and TPOs 30 for a near certainty of 'yes' approval that can be presented to consumers. Base pricing may support best real-time, lender pricing available for various lock or float periods (i.e., 15-day, 30-day, 45-day, 60-day), rate buy-up or buy-down, origination channel (wholesale or correspondent), geographic, and sponsor relationship. Pricing may be time-date stamped with effective and expiration dates and may be displayed as rate/points or as % of par basis.

The technology platform 100 may provide TPOs 30 (including wholesale brokers and correspondents) with a web based service that may support their mortgage loan origination activities by providing a single source where they can search for the multiple loan program and pricing options for a particular borrower scenario. The result set of product evaluations may include fully adjusted product eligibility, pricing and underwriting approval comparisons for all lenders' loan programs participating on the technology platform 100.

TPOs 30 may have the mortgage loan delivery system available at the point of sale to perform various loan origination activities. Such activities may include: (i) performing preliminary qualification searches, (ii) searching and selecting lender sponsors, both existing and new, (iii) requesting registration with a lender, if not currently sponsored with a particular lender, (iv) searching and selecting products with pricing, (v) making pricing adjustments for selected products, (vi) managing the TPO's loan pipeline. Lenders 20 may have the ability to maintain and manage their product and pricing availability, their eligibility criteria, their rate lock workflow, and their loan pipeline. The secondary mortgage market participant 50 may have the ability to maintain and manage overall product availability, manage lenders, and troubleshoot TPO and lender processing issues.

The technology platform 100 may be accessible to authorized users via a communication network (e.g., the Internet) using an Internet browser or using specialized software. The technology platform 100 may permit secondary mortgage market participant 50 super-user access via a corporate Intranet. The technology platform 100 may be accessible through 1) Direct URL; 2) a desktop-based origination system; 3) loan origination system integration. The log-in may require users to be 1) sponsored with lenders participating on the platform; or 2) registered as a system user. Authentication of usernames and passwords and user access profiles and rights may occur. User administration includes establishing new users, modifying existing users, and deleting users and access rights. Access to functions and read or write capabilities may be based on roles established for each of the different user types. Each individual's data, rules, and user configurations may not be viewable or accessible by other users of the system.

Figure 7:
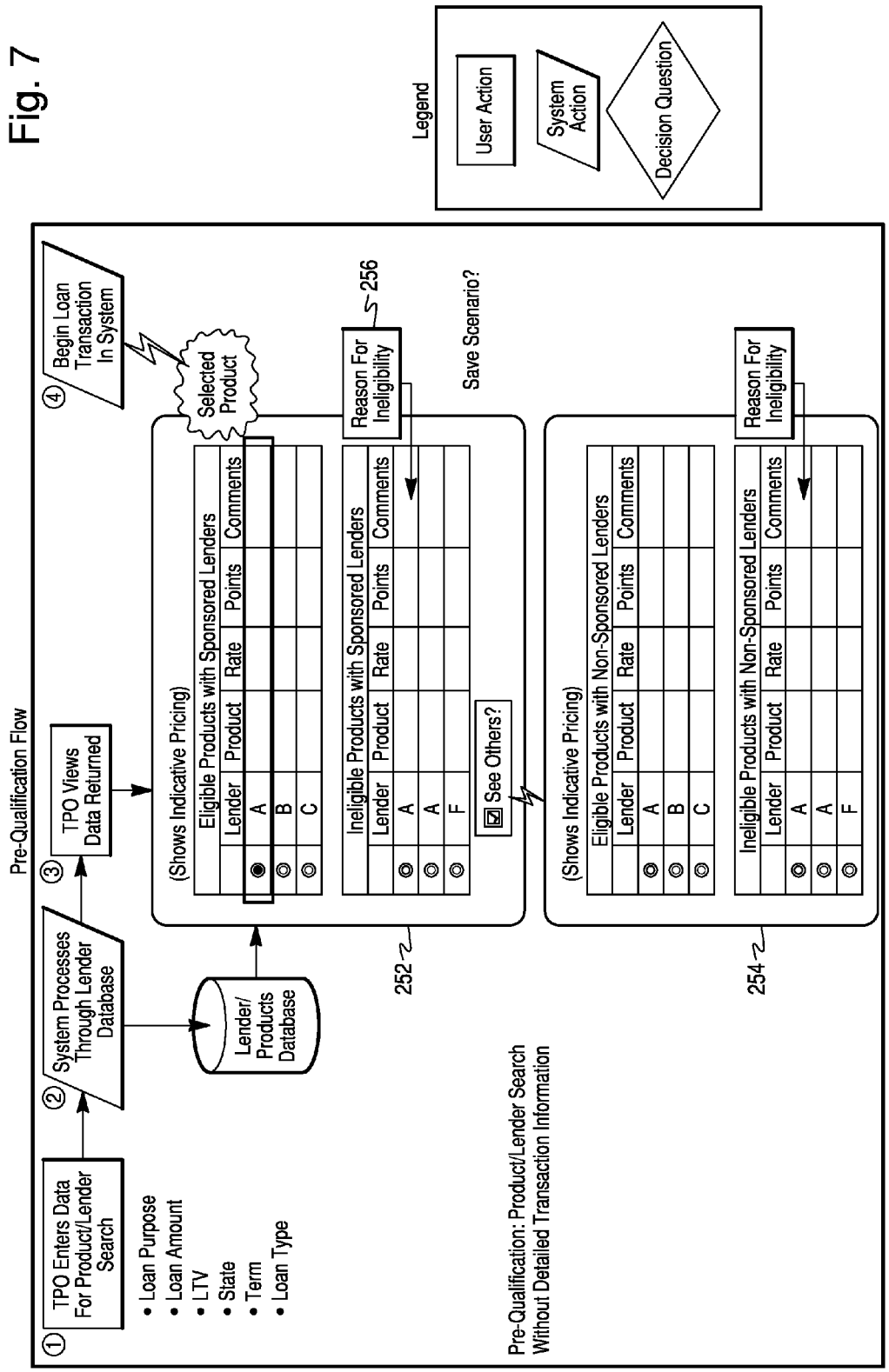
FIG. 7 is a flowchart of the pre-qualification process, wherein the TPO performs a preliminary product and lender search without having detailed transaction information.

The technology platform 100 provides an online help system in HTML that describes and illustrates system functions. FIG. 7 shows the proposed interaction of the TPO 30 performing a preliminary product and lender search without having detailed transaction information to give them a sense of the type of product their customers may be eligible to obtain. FIG. 7 also shows examples of pricing screens 252 and 254 that may be provided to the TPO 30. In screen 252, for example, the TPO 30 is provided with information regarding eligible products from different lenders, including rate and point information. For ineligible products, the TPO may be provided with additional information concerning the reasons for eligibility in a comment field 256.

Figure 8:
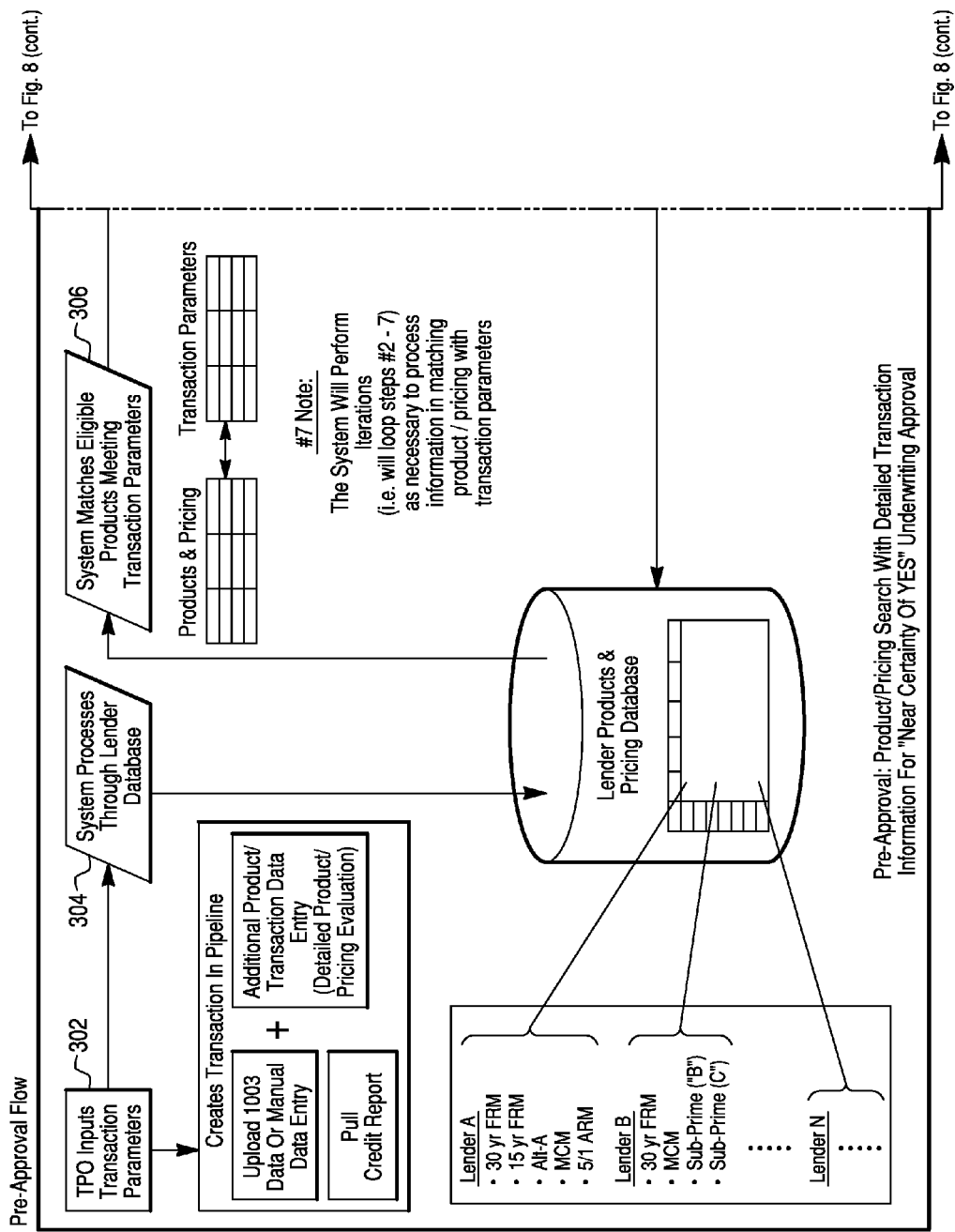
FIGS. 8 and 9 are flowcharts of the pre-qualification process, wherein the TPO performs a product and lender search while having detailed transaction information.
Figure 8:
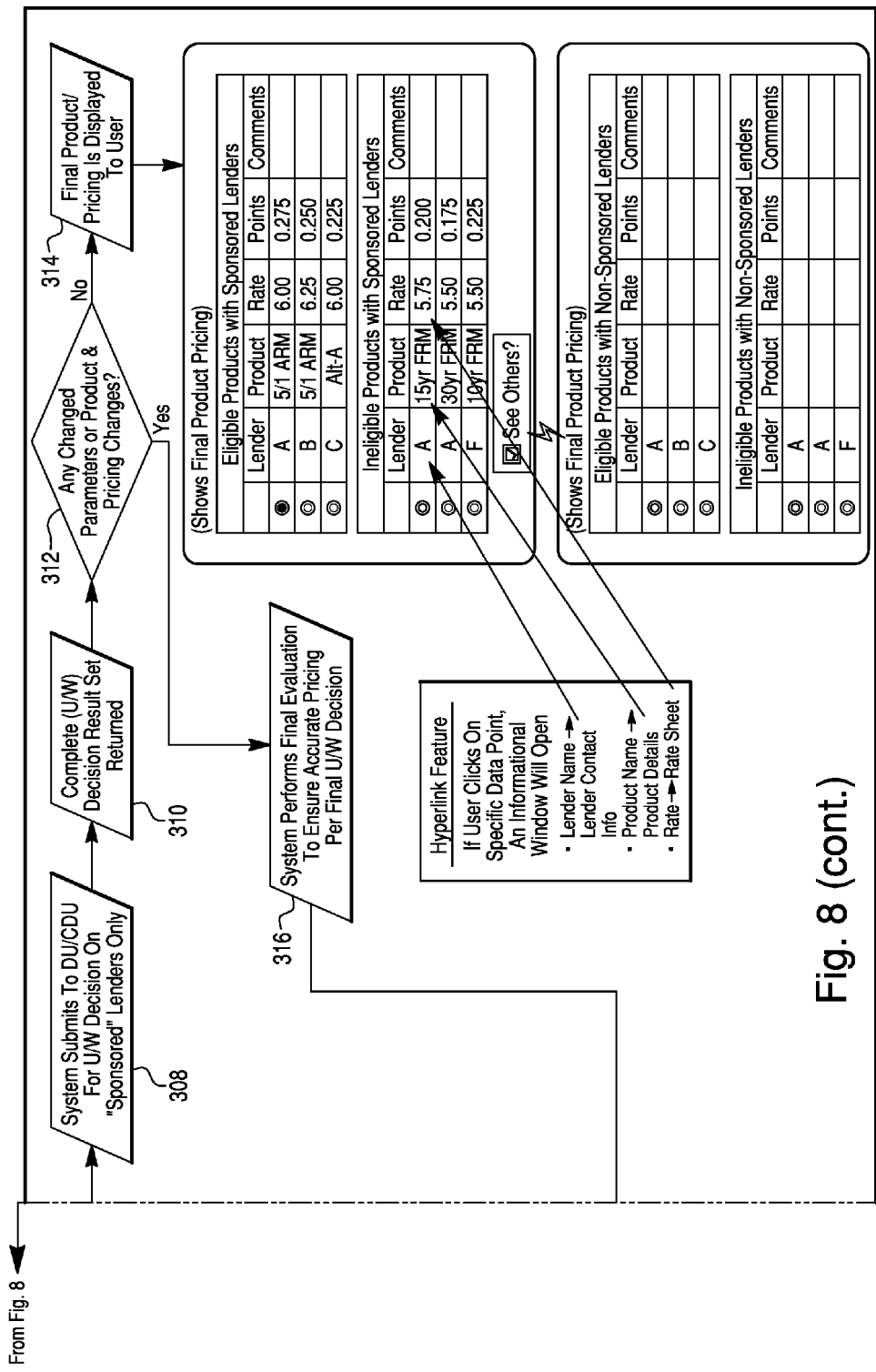
Figure 9:
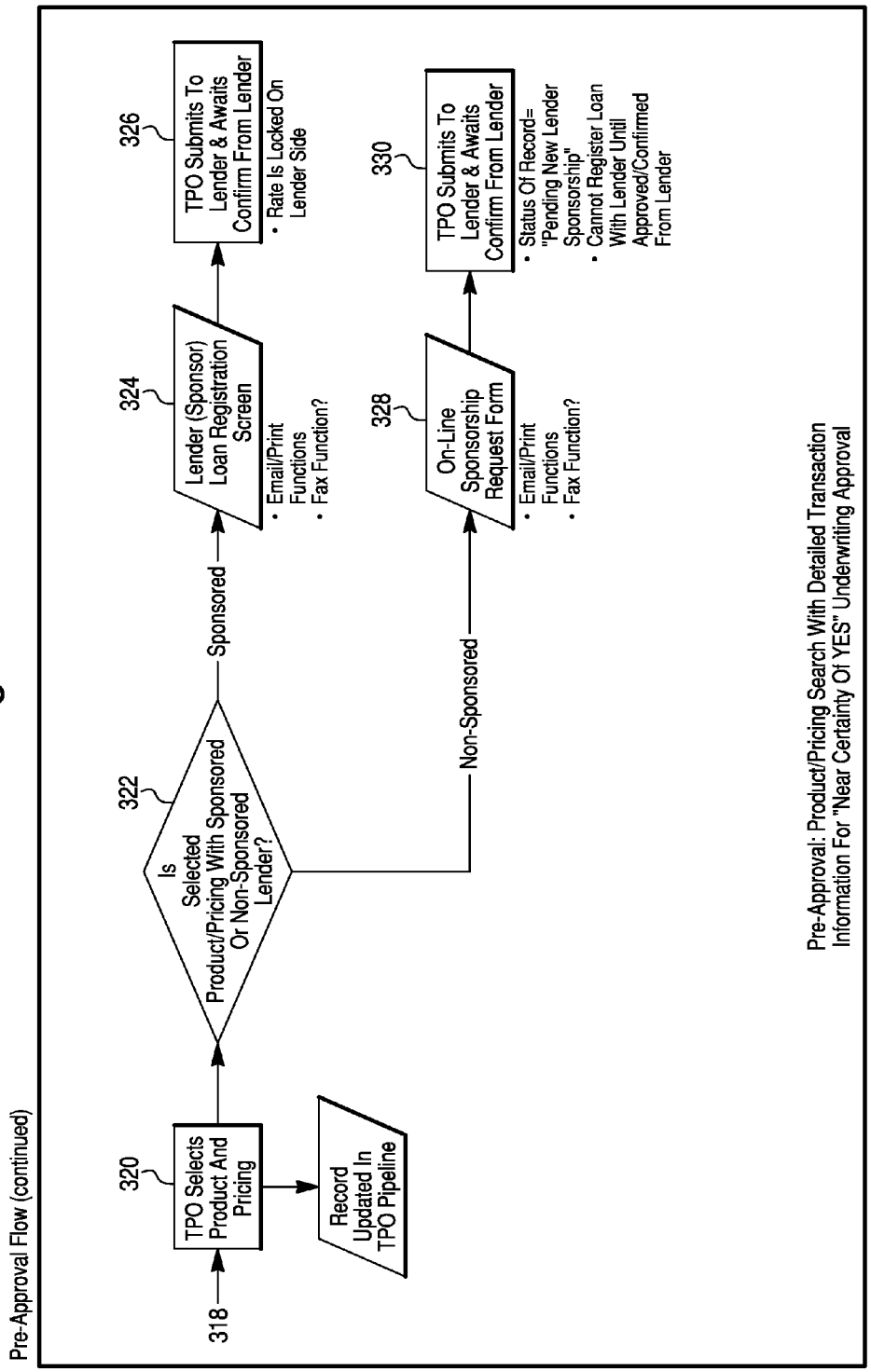

Referring now to FIGS. 8 and 9, the proposed interaction of the TPO performing a product and lender search while having detailed transaction information in order to receive a full product menu with pricing that has a near-certainty of "yes" including final underwriting approvals is shown. The mortgage loan delivery system provides a method comprising steps 302-330 by which a TPO can subunit a single loan application/transaction to the technology platform 100 and get an instant loan product decision, which has the ability to be routed directly to the appropriate lender for funding and delivery.

Figure 10:
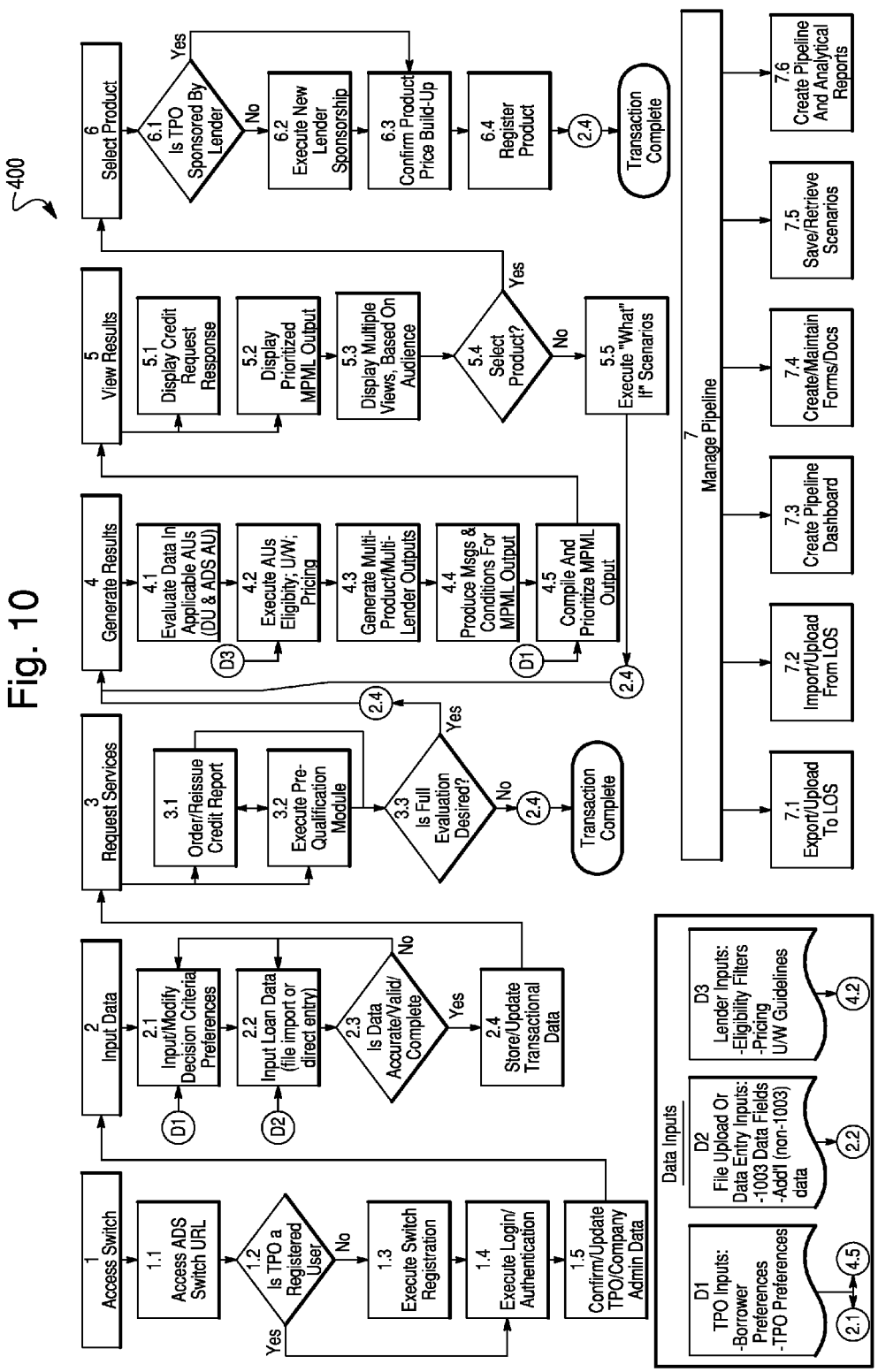
FIG. 10 shows a more detailed view of TPO transactional process steps.

As previously indicated, and as shown in FIGS. 8-9, in one embodiment, a product and pricing option may be provided that provides a near-certainty of "yes" for final underwriting approval. The product and pricing and associated approval may have already been run through an underwriting decision-making engine 112 and may incorporate all conditions and stipulations. This means that the approval is as close to final as the TPO 30 can obtain at that stage, i.e., that there would not be any more stipulations or conditions they would have to meet that are not stated in the approval. The product offering returned upon request for products that match the transaction parameters input by the TPO 30 may display multiple products from multiple lenders who are participating in the platform. As shown in FIGS. 8-9, the result set displays eligible and ineligible products, and sponsored and non-sponsored products with pricing that has a near-certainty of "yes" with respect to the final underwriting approval, regardless of the lender 20 that ultimately funds the loan and regardless of the secondary mortgage market participant 50 or other investor 60 that ultimately purchases the loan. FIG. 10 shows a more detailed view 400 of the TPO transactional process steps.

In another embodiment, the pricing offered for multiple products upon request for products matching the detailed transaction parameters may reflect the fully adjusted price and incorporate real-time prices. At this point, the pricing may have been adjusted for all the pricing components (i.e. "bumps"). For example, it should include the TPO build-up pricing component, any adjustments needed based on conditions and stipulations, etc. Secondary mortgage market participant 50 may have prior agreements with lenders who will participate in the platform 100 in listing their products and pricing and in receiving new requests for sponsorship through the platform 100.

In yet another embodiment, the system may be configured to provide multi-product and multi-lender evaluation of a loan data to deliver loan program(s) with real-time pricing to the TPOs, for example, as described in the above-mentioned '703 application. As indicated previously, the system may support automated decision-making for conforming products of secondary market participants, as well as Lender's conforming and non-conforming (non-prime) products simultaneously, using underwriting logic 114, 116. The system may be configured to utilize a TPO-to-Approved Seller/Servicer sponsorship model available via a desktop-origination system, in order to facilitate product decision-making and loan delivery requirements to the secondary market participants. The system may be configured to couple with a loan underwriting module, by providing participating lenders with the ability to build/maintain product underwriting and pricing rules directly on the system. The system may be configured to work within the existing data entry and origination processes currently utilized by TPOs (e.g., application upload from LOS, direct data entry, etc.). The system may be further configured to incorporate a modular functionality that may support the flexibility to offer discrete features (e.g., product decision-making) and services (e.g., outsourced fulfillment) as determined by the business and stakeholder needs, as well as be designed to provide hosting flexibility and portability (ability to host externally or internally) and be migrated as necessary according to the business needs of the secondary mortgage market participants.

In yet another embodiment, the platform 100 may provide a multi-product/multi-lender decision engine that provides results according to the TPO user's chosen criteria (e.g., lowest APR, lowest monthly payment, highest YSP, etc.). The decision engine may deliver complete and accurate loan product eligibility, pricing, and underwriting conditions associated with every available product (prime and non-prime) for a given loan transaction. The detailed pricing may be available to be viewed, printed, and/or exported via data file transfer. The platform 100 may provide stakeholders with the ability to apply eligibility and pricing adjustments as necessary according to their business needs. The engine may provide TPOs 30 with the ability to view complete product rate sheets including for multiple lock periods and rate/point combinations. The lenders' product pricing available via the engine must be equal to or better than any other Wholesale/Correspondent pricing available through any other distribution channel (e.g., their proprietary web site).

In yet another embodiment, the system may be configured to display eligible as well as ineligible products with reasons for ineligibility and products from sponsored as well as non-sponsored lenders. The platform may support TPOs ability to request new lender sponsorship. The platform may support complete URLA (form 1003) data capture and upload from LOS systems along with data validation and view capability. The platform may provide TPOs with the ability to view a transaction pipeline with status associated with each loan. The platform may have the ability to export all transaction specific data in industry standard formats to support loan registration, processing and document generation (e.g., GFE, TIL, and other disclosures). The platform may support the ability for TPOs to order credit independent of a loan decision-making transaction.

The embodiments of the present invention have been described with reference to drawings and charts, including the appendices. The drawings illustrate certain details of the specific embodiments that implement the systems and methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present invention may be practiced in a networked environment using logical connections to one or more remote computers having processors. Those skilled in the art will appreciate that such network computing environments may encompass many types of computers, including personal computers, hand-held devices (e.g., cell phones, personal digital assistants, portable music players, portable e-mail devices, and so on), multi-processor systems, microprocessor-based or programmable consumer electronics, network PCs, minicomputers, mainframe computers, and so on. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing devices in the form of computers, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention. Such variations will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the design, operating conditions and arrangement of the embodiments without departing from the scope of the present invention.

We claim:

1. A computer-implemented data processing system comprising:
    a database which stores information including pricing information, for products and services offered by a plurality of third-party originators, a plurality of fulfillment providers, and a plurality of lenders;
    user interface logic configured to provide user interfaces accessible to the plurality of third-party originators, the plurality of fulfillment providers, and the plurality of lenders, and a secondary mortgage market participant, the user interfaces being made accessible by way of a communication network;
    pricing logic, the pricing logic being configured to cooperate with the user interface logic to provide lenders and fulfillment providers with the ability to apply pricing adjustments to the pricing information stored in the database, wherein the pricing logic is configured to update the pricing information in the database based on the adjustments received and to reflect the adjustments in pricing information provided to the third-party originators;
    relationship management logic being configured to manage relationships between the plurality of third party originators, the plurality of fulfillment providers, and the plurality of lenders, wherein the relationship management logic comprises logic configured to permit third party originators to select fulfillment providers for loan processing and to select lenders for loan financing;
    transaction processing logic, the transaction processing logic being configured to support transaction processing for transactions associated with service requests and loan financing between the plurality of third-party originators, the plurality of fulfillment providers, the plurality of lenders, and the secondary mortgage market participant, the transaction processing logic maintaining information regarding services performed by various parties including the pricing of the services performed; and
    a risk mitigation tool, the risk mitigation tool being configured to cooperate with the user interface logic to provide the secondary mortgage market participant with the ability to manage and mitigate risk created by the plurality of third party originators and the plurality of fulfillment providers, using performance data concerning performance of individual third party originators and fulfillment providers, and an overall score generated for each of the third-party originators and fulfillment providers based on the performance data, wherein the performance data is stored in the database.

2. A system according to claim 1, wherein the relationship management logic is further configured to permit the third party originators to select fulfillment providers and lenders in real-time as loans are originated.

3. A system according to claim 2, wherein the relationship management logic is further configured to permit the third party originators to select fulfillment providers and lenders using one of the user interfaces provided by the user interface logic.

4. A system according to claim 1, wherein the relationship management logic is further configured to permit the third party originators to select fulfillment providers and lenders in advance of originating loans, thereby permitting automatic routing of service requests to the fulfillment providers and loan sales to the lenders.

5. A system according to claim 4, wherein the relationship management logic further comprises a rules engine, the rules engine being used to permit the third party originators to select fulfillment providers and lenders.

6. A system according to claim 1, wherein the relationship management logic comprises rules engines.

7. A system according to claim 1, wherein the relationship management logic comprises logic configured to permit lenders to select third-party originators for loan financing transactions.

8. A system according to claim 1, wherein the relationship management logic comprises logic configured to permit fulfillment providers to select third-party originators for whom to provide services.

9. A system according to claim 1, wherein the computer-implemented data processing system is configured to allow the third-party originators to provide the pricing information to borrowers, and wherein the adjustments received are reflected in the pricing information.

10. A system according to claim 1, wherein the communication network is the Internet.

* * * * *